F. E. THOMES.
HAND TRUCK.
APPLICATION FILED OCT. 18, 1909.

970,137.

Patented Sept. 13, 1910.

Witnesses:
Edith M. Hinckley
Eleanor W. Dennis

Inventor:
Frank E. Thomes
by S. W. Bates
Atty.

UNITED STATES PATENT OFFICE.

FRANK E. THOMES, OF PORTLAND, MAINE.

HAND-TRUCK.

970,137.  Specification of Letters Patent.  Patented Sept. 13, 1910.

Application filed October 18, 1909. Serial No. 523,187.

*To all whom it may concern:*

Be it known that I, FRANK E. THOMES, a citizen of the United States of America, and a resident of Portland, in the county of Cumberland, State of Maine, have invented certain new and useful Improvements in Hand-Trucks, of which the following is a specification.

My invention relates to hand trucks of that class having two side bars formed at one end into handles, the other end resting on supporting wheels, with a fulcrum plate joining the side bars forward of the wheels. These trucks are extensively used in loading and unloading cars and steam-boats where it is necessary to pass and repass over a narrow gang plank. The work is generally done with a crew of men who are continually passing over the gang plank or through a door in opposite directions. When the trucks are loaded with merchandise or are pushed along in their normal position, it often happens that there is not width enough to allow the empty trucks to pass the loaded trucks and as a result lines of men with empty trucks are often kept waiting inside the car or vessel.

The object of my invention is to so construct this form of hand truck that the empty truck can be tipped up edgewise and pushed along taking up much less room than when wheeled flat in its normal position and enabling the men to pass many times by a line of loaded trucks where otherwise they could not do so. I accomplish this result by placing a rolling member on the side of the truck near one of the supporting wheels in such a position that it will allow the truck to be pushed along when tipped up on edge.

I illustrate my invention by means of the accompanying drawing in which—

Figure 1:
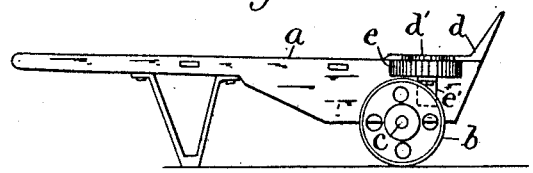
Figure 2:
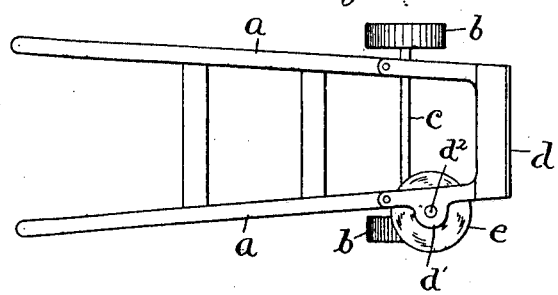

Figure 1 is a side view of a hand truck having my attachment, and Fig. 2 is a plan of the same.

In the drawing *a a* represent the side bars of the truck with the ends formed into handles in the usual manner, *b b* are the supporting wheels and *d* is the fulcrum plate which unites the forward ends of the side bars. A rolling member is provided at one side near the forward end to permit the truck to be tipped up on its edge. As here shown, I provide a wheel *e* which is journaled above one of the supporting wheels and in a plane at right angles to said wheel. The wheel *e* is partially contained in a shallow recess formed in the top of one of the side bars and it is held between a bracket *e'* which is immediately below it and a lateral extension *d'* of the plate which supports the fulcrum plate *d*. The pin $d^2$ passes down through the plate *d'*, the wheel *e* and the bracket *e'* and serves to journal the wheel in position. The wheel *e* extends as shown somewhat outside of the wheel *b* so that when the truck is turned up, it will rest fairly on the wheel and it projects through the side bar and into the space between the side bars. The wheel may be located on either or both sides of the truck as desired and it may be constructed otherwise than as here shown.

The truck as constructed may be easily tipped up when empty and when in this position it may be readily passed through a narrow space and when tipped down flat it takes up but little more space than the plain truck without my attachment.

I claim:—

1. The herein described hand truck of the class specified having a pair of supporting wheels at its forward end and a pair of operating handles at its rear end and having an auxiliary rolling member on its side and adjacent to the forward end positioned to support the forward end of the truck when tipped up on its side.

2. The herein described hand truck of the class specified having a pair of supporting wheels at its forward end and a pair of operating handles at its rear end and having an auxiliary wheel journaled at the side and adjacent to one of the supporting wheels and positioned to support the forward end of the truck when the same is tipped up on one side.

3. The herein described hand truck of the class specified, having a pair of supporting wheels on its forward end and a pair of operating handles on its rear end and having an auxiliary wheel journaled at the side and adjacent to one of the supporting wheels with a substantially vertical axis for supporting the forward end of the truck when tipped up on its side.

4. The herein described hand truck of the class specified having two side bars one of which has a recess in its top edge near its forward end and a pair of supporting wheels, an auxiliary wheel journaled above and adjacent to one of the supporting wheels and substantially at right angles thereto and extending laterally through said recess.

5. The herein described hand truck of the class specified having two side bars one of which has a recess in its top edge near its forward end and a pair of supporting wheels, an auxiliary wheel above and adjacent to one of the supporting wheels and substantially at right angles thereto, a bracket beneath said auxiliary wheel, a supporting plate secured to the top of the side bar and covering said recess and a pivoting pin passing through said plate, auxiliary wheel and bracket to journal said wheel in place.

In witness whereof I have hereunto set my hand this 9th day of October, 1909.

FRANK E. THOMES.

Witnesses:
S. W. BATES,
ELEANOR W. DENNIS.